May 11, 1926.

G. R. LIVERGOOD

PIPE ENGAGING SLIP

Filed July 12, 1924   2 Sheets-Sheet 1

1,584,388

G. R. Livergood  Inventor

By Jesse R. Stone

Attorney

May 11, 1926.

G. R. LIVERGOOD

PIPE ENGAGING SLIP

Filed July 12, 1924    2 Sheets-Sheet 2

1,584,388

G. R. Livergood  Inventor

By  Jesse R. Stone

Attorney

Patented May 11, 1926.

1,584,388

UNITED STATES PATENT OFFICE.

GERALD R. LIVERGOOD, OF HOUSTON, TEXAS.

PIPE-ENGAGING SLIP.

Application filed July 12, 1924. Serial No. 725,607.

My invention relates to slips to be employed in holding the pipe ordinarily used in the drilling of wells while the joints of the pipe are being screwed up or unscrewed, as frequently becomes necessary. A slip of this nature may be used in connection with the drilling operations and may also be employed in pumping apparatus where the tubing used in connection with the pump must be removed from the well for repair at intervals.

Figure 1:
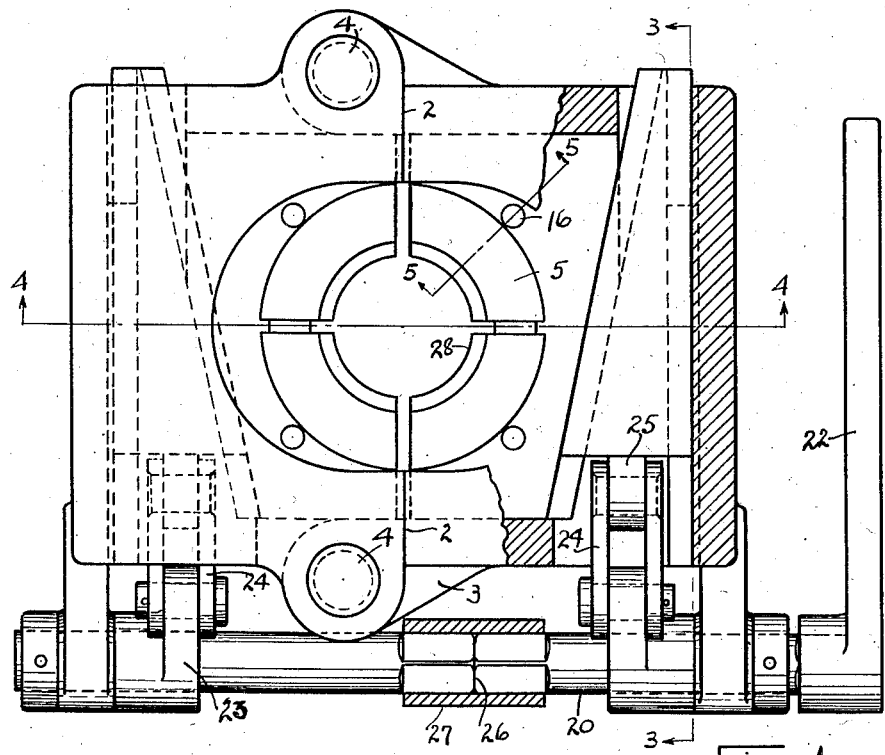
Figure 2:
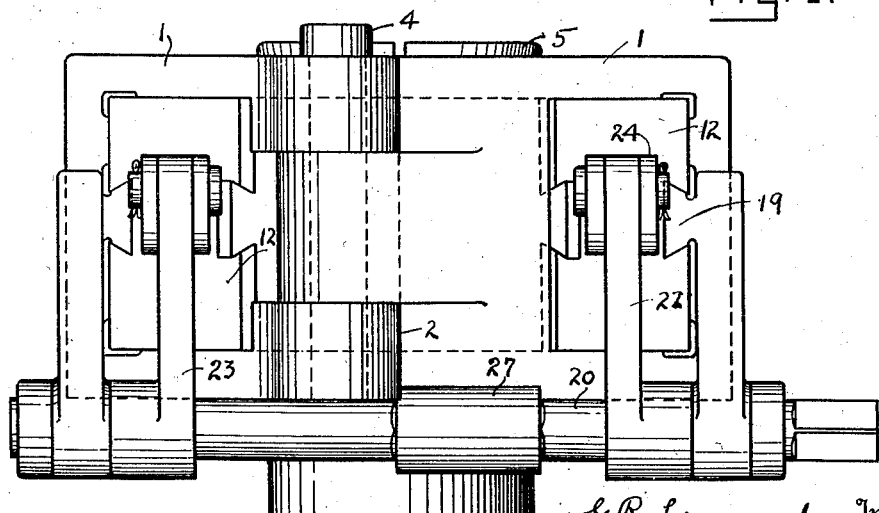
Figure 3:
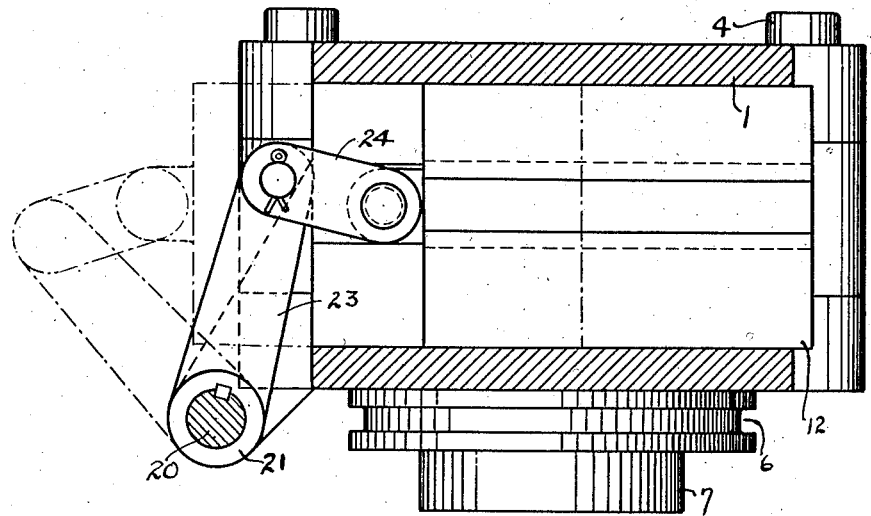
Figures 4, 5:
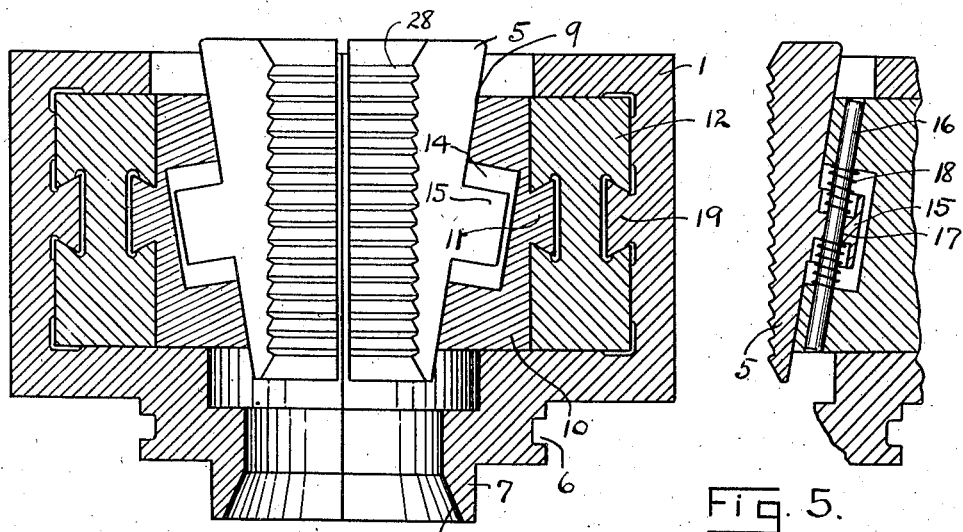

It is an object of the invention to provide a pipe engaging slip, which may be operated to grip or release the pipe readily by the simple manipulation of an operating lever. It is another object to provide a positive slip-retaining device by means of which the slip may be moved directly away from the pipe, thus assuring a simple and positive release. Other objects and advantages will be apparent from the description which follows:

Referring to the drawing herewith Fig. 1 is a top plan view of a slip embodying my invention, certain parts being broken away for greater clearness. Fig. 2 is a side elevation of the device. Fig. 3 is also a side elevation taken at right angles to the view shown in Fig. 2, certain parts being in section on the plane 3—3 of Fig. 1, Fig. 4 is a central longitudinal section on the plane 4—4 of Fig. 1. Fig. 5 is a broken vertical section on the plane 5—5 of Fig. 1.

Like numerals of reference are employed to designate like parts in all the views.

In constructing my device, I provide a block 1 which serves as a housing for the slips and operating mechanism. Said block is formed in two parts divided centrally along a line 2. The two parts are secured together by the provision, on the opposite sides of the two parts, of laterally extending ears 3 which are provided with an opening to receive a locking pin 4. It will be noted that there are two opposite locking pins thus securing the two opposite halves of the block firmly together at each side. The lock is rectangular in general shape, but has a central vertical opening therethrough to provide a passage for the pipe which is to be handled.

The central portion of the block about the opening is formed with a recess to receive the slips 5, which are to engage the pipe. The lower portion of the block below these slips is extended downwardly, having an annular groove or slot 6 on the lower side whereby it may be clamped into engagement with the rotary or with the casing head as occasion requires. A reduced flange is formed at the lower side about the opening through which the pipe extends, and said flange is beveled at 8 to better direct the pipe into the said opening.

The central portion of the block or housing is channeled out transversely to receive a split casting 10 having a tapered opening forming a bowl 9 to receive the slips. This bowl 9 is made up of two opposite parts, which are adapted to slide toward and away from the central opening through the block. Each of said parts of the bowl has on its outer face a beveled portion formed with a tenon 11, by means of which it may be engaged with an operating block 12, having a mortice 13 therein to receive the tenon. The inner face of each member 10 is tapered downwardly and is circular in shape to receive the jaws or slips 5. There is a central recess 14 cut on the inner face of the members 10 to receive laterally extending lugs 15 upon the slips. As shown in Fig. 1 there are 4 slips or jaws and the lateral lugs 15 thereon are formed with openings therethrough to receive the inclined pins 16, said pins extending downwardly parallel with the face on the bowl through the openings 14 and through openings 17 formed in the lugs 15 of the jaws, as shown particularly in Fig. 5. The lugs 15 on the jaws are recessed above and below the opening through which the pin extends and springs 18 are set in said recesses bearing against the walls of the openings 14 and thus tending to hold the jaws resiliently in a position midway between the upper and lower walls of the recesses 14.

Each of the blocks 10 are thus connected with the slips in such manner that each block operates two of the slips, having four slips in all. The blocks are moved toward and away from the pipe by the dovetailed connection between the block 10 and the operating block 12, previously referred to. The said block 12 is wedge-shaped as viewed from above, as indicated in Fig. 1. It has a mortice and tenon connection with the block 10 at one side and a similar mortice and tenon connection with the inner wall of the housing 1 at the other, and to form this connection a tenon 19 is formed on the inner face of the housing and a mortice on the inner face of the operating block 12 engages therewith so that the block 12 may be moved longitudinally within the housing. The said block is formed parallel with the housing on the outer face, and is inclined upon the other face thereof so as to move the block 10 laterally as the block 12 is moved in a direction at right angles to the direction of movement of the block 10.

The two operating blocks 12 are moved forward and backward within the housing by means of an operating lever at the side of the block. This lever is formed upon a shaft 20 journaled in bearings 21 at the lower side and at one end of the housing 1. On one end of said shaft is an operating lever 22. Operating levers 23 are mounted on the shaft and keyed thereto to rotate with the shaft. At the upper end of the said lever a pair of links 24 is pivoted, said links being connected at the other end thereof to a lug 25 projecting from the end of the operating block 12. For convenience of assembly the shaft 20 is split at 26 and is squared adjacent to the split portion to receive a sleeve 27, fitting over the squared ends of the shaft, thus allowing the two parts of the block to be disconnected and again connected by a removal of the pins 4, and the sliding of one end of the shaft away from the other in an obvious manner.

The slips are similar to other pipe engaging slips, except as to the points noted. Their inner faces are arranged vertically and have teeth 28 thereon to engage the pipe. They are adapted to move vertically from their normal conditions against the action of the springs 18, previously referred to.

In operating the device the rocking of the shaft 20 by means of the lever 22 will throw the operating blocks 12 forwardly or backwardly, as desired. When the blocks are thrown forwardly by the lever the action will be to force the slip engaging blocks 10 inwardly towards the pipe, and it is obvious that the operating blocks may be employed to force the slips tightly against the pipe so as to prevent any downward movement thereof. The slips are adapted to move downwardly, after engagement with pipe sufficiently to obtain a grip securely against the action of the springs 18, and when the slips are again released from the pipe the springs 18 will raise the slips again to their normal position. When it is desired to release the pipe the operating lever is thrown in the opposite direction, thus acting to withdraw the slip engaging block 10 and move the slips radially away from the pipe. This movement will release the pipe without any jar or mutilation of the pipe as is some times necessary where the slips are mounted within the ordinary bowl or seat.

The advantages of this type of construction lie within the ease with which the slips may be operated by only one operator and by the use of only one hand of the operator. It is of further advantage in that the slips may be quickly released from their gripping position without the necessity of pounding them loose, as is some times the case with the ordinary slips. The device is simple in construction and positive in its action, and will not easily get out of order.

Further objects and advantages will be plain to those skilled in the art without further description. What I claim as new and desire to protect by Letters Patent, is:

1. In a device of the character described, a housing having a central vertical opening therethrough, a plurality of pipe engaging slips on opposite sides of said opening, slip engaging blocks slidable in said housing, a resilient connection between said blocks and said slips and means in said housing to move said blocks and slips toward and away from said opening.

2. In a device of the character described, a housing having a central vertical opening therethrough, pipe engaging slips in said opening, two opposite blocks adapted to resiliently support said slips and means to simultaneously move said supporting blocks laterally to and from said opening.

3. In a device of the character described, a housing having a central vertical opening therein, two opposite laterally sliding blocks in said housing, pipe engaging slips on said blocks and means to slide said blocks and slips simultaneously toward and away from said opening.

4. In a device of the character described, a housing, slip blocks slidable laterally in said housing, wedge-shaped operating blocks having a morticed connection with said slip blocks and said housing, slips connected with said slip blocks and means to move said operating blocks to simultaneously advance or withdraw said slips and blocks.

5. In a device of the character described, a housing, opposite slip blocks slidable horizontally in said housing said blocks having a tapered inner face forming a bowl, slips movable vertically in said bowl and supported resiliently therein, and means to slide simultaneously both said opposite slip blocks toward and away from the center of said housing.

6. In a device of the character described, a housing, a split downwardly tapered bowl therein, pipe engaging slips supported resiliently in said bowl and wedge-shaped blocks engaging said bowl to move the parts of said bowl and said slips to and from each other.

7. In a device of the character described, a housing, a split downwardly tapered bowl therein, pipe engaging slips supported resiliently in said bowl and means to move the parts of said bowl and said slips to and from each other, comprising an operating block movable at right angles to the direction of movement of said bowl.

8. In a device of the character described a plurailty of pipe engaging slips, slidable blocks resiliently supporting said slips, and means to move said blocks and slips in a direction at right angles to the pipe.

9. In a device of the character described, a plurality of pipe engaging slips, slidable blocks adapted to support said slips, lateral lugs on said slips fitting loosely in recesses in said blocks, pins extending through said lugs in said recesses, and springs in said recesses above and below said lugs.

In testimony whereof I hereunto affix my signature this 9th day of July, A. D. 1924.

GERALD R. LIVERGOOD.